US011935500B2

(12) United States Patent
Guynes et al.

(10) Patent No.: US 11,935,500 B2
(45) Date of Patent: Mar. 19, 2024

(54) CUSTOMIZABLE ONSCREEN DISPLAY REFERENCE POINTS

(71) Applicant: Hewlett-Packard Development Company, L.P., Spring, TX (US)

(72) Inventors: Timothy Guynes, Spring, TX (US); Alexander Williams, Spring, TX (US); Syed Azam, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/045,503

(22) PCT Filed: Dec. 13, 2018

(86) PCT No.: PCT/US2018/065445

§ 371 (c)(1),
(2) Date: Oct. 6, 2020

(87) PCT Pub. No.: WO2020/122920

PCT Pub. Date: Jun. 18, 2020

(65) Prior Publication Data

US 2021/0366431 A1 Nov. 25, 2021

(51) Int. Cl.
*G09G 5/00* (2006.01)
*G09G 5/02* (2006.01)

(52) U.S. Cl.
CPC ............... *G09G 5/003* (2013.01); *G09G 5/02* (2013.01); *G09G 2320/08* (2013.01); *G09G 2340/0407* (2013.01); *G09G 2340/0464* (2013.01)

(58) Field of Classification Search
CPC ...... G09G 5/003; G09G 5/02; G09G 2320/08; G09G 2340/0407; G09G 2340/0464
See application file for complete search history.

(56) References Cited

U.S. PATENT DOCUMENTS 5,995,102 A 11/1999 Rosen et al.
7,705,864 B2 * 4/2010 Ahmed .................. G09G 5/391 345/667
8,463,020 B1 6/2013 Schuckmann et al.
2004/0111597 A1 * 6/2004 Rothman .............. G06F 9/4411 713/1
2005/0086238 A1 4/2005 Nevin
(Continued)

FOREIGN PATENT DOCUMENTS

CN 103838534 6/2014

OTHER PUBLICATIONS

AOC Technologies , “AOC G2460PG Menu System (OSD)” , Oct. 29, 2014.
(Continued)

*Primary Examiner* — Grace Q Li
(74) *Attorney, Agent, or Firm* — Quarles & Brady LLP

(57) ABSTRACT

In an example implementation according to aspects of the present disclosure, a method may receive a set of customizable characteristics corresponding to an onscreen display reference point. The onscreen display reference point may be composed based on the set of customizable characteristics. The onscreen display reference point may be stored in nonvolatile memory. The onscreen display reference point may be rendered on a display, wherein the rendering is independent of a video stream.

20 Claims, 7 Drawing Sheets

(56) References Cited

U.S. PATENT DOCUMENTS

| | | | | |
|---|---|---|---|---|
| 2007/0291185 | A1 | 12/2007 | Gelb et al. | |
| 2009/0141045 | A1* | 6/2009 | Jackson | G09G 5/391<br>345/658 |
| 2010/0201878 | A1 | 8/2010 | Barenbrug et al. | |
| 2011/0234654 | A1* | 9/2011 | Park | H04N 21/47<br>345/204 |
| 2014/0143668 | A1 | 5/2014 | Hsu | |
| 2016/0093324 | A1* | 3/2016 | Domke | G11B 7/261<br>369/275.3 |
| 2016/0284258 | A1* | 9/2016 | Brunner | G09G 3/006 |
| 2018/0103036 | A1* | 4/2018 | Fox | H04W 4/40 |
| 2018/0151150 | A1* | 5/2018 | Volpi | G09G 5/005 |
| 2019/0066572 | A1* | 2/2019 | Chang | G09G 5/005 |

OTHER PUBLICATIONS

David Pemberton , "OSD Crosshair Generator 30X30MM Board" , Sep. 28, 2013.

* cited by examiner

CUSTOMIZABLE ONSCREEN DISPLAY REFERENCE POINTS

BACKGROUND

Display systems present video renderings with rapidly changing content. The rapidly changing content often presents images that may direct the focus of a viewer.

DETAILED DESCRIPTION

In one implementation, a system including a controller attached to a display may receive a set of customizable characteristics corresponding to an onscreen display reference point. The controller may compose the onscreen display reference point based on the set of customizable characteristics. The customizable characteristics may include an alpha value, a configuration setting, and a color value. The controller may store the onscreen display reference point in the non-volatile memory. The controller may then render the onscreen display reference point on a display, wherein the rendering is independent of a video stream.

Figure 1:
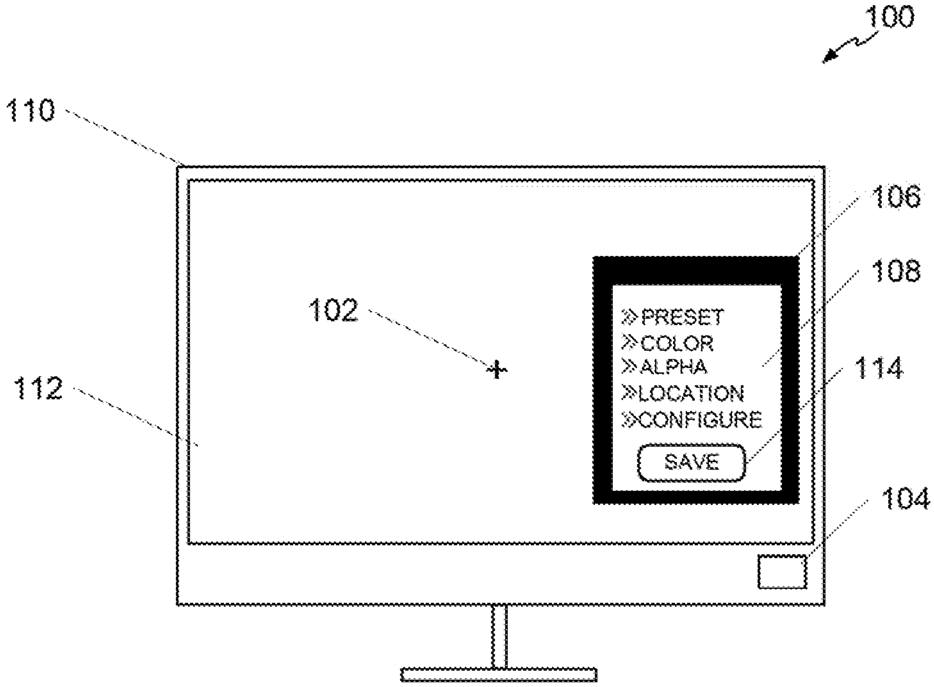
FIG. 1 illustrates a system for customizable onscreen display reference points, according to an example.

FIG. 1 illustrates a system 100 for customizable onscreen display reference points, according to an example. The system 100 may include a display 110, a controller 104, an onscreen display reference point 102, an onscreen display 106, a set of customizable characteristics 108, a video stream 112, and a store command 114.

The display 110 may provide a basis fora video rendering of the onscreen display reference point 102. The display 110 may include but is not limited to display panels based on liquid crystal displays (LCDs), organic light emitting diodes (OLEDs), quantum-dot light emitting diode (QLEDs), and cathode ray tubes (CRTs). In one implementation, the display 110 may be a standalone monitor capable of connecting to a computer. The display 110 may be connected to the computer through an industry standard connection interface such as high definition multimedia interface (HDMI) or DisplayPort. In another implementation, the display 110 may be connected to an integrated system, where the display 110 is not a discrete or separate component. For example, a tablet or mobile device may be an integrated system. In another implementation, the display 110 may be included in a head mounted display (HMD). The HMD may be utilized in various virtual reality (VR), mixed reality (MR) or augmented reality (AR) applications. The display 110 may also include a controller 104. In other implementations, the controller 104 may be physically separate from the display 110, yet communicatively coupled to the display 110.

The controller 104 may control various aspects of the display 110 including displaying an onscreen display reference point 102 as well as the operation and rendering of an onscreen display 106. The controller 104 may be coupled to the display 110. The controller 104 may include hardware, software, firmware or a combination thereof to render a graphics overlay on the display. The graphics overlay may include individualized or individually controlled graphical components such as the onscreen display reference point 102 and the onscreen display 106. The controller 104 may render either the onscreen display reference point 102 on the screen, the onscreen display 106, or both simultaneously. The controller 104 may include functionality for controlling display 110 resolution either explicitly through the onscreen display 106 or implicitly as determined from a received video stream 112. In the implicit resolution determination mentioned previously, the controller 104 may detect the resolution of the received video stream 112 and adjust the rendering of onscreen display 106 and the onscreen display reference point 102 accordingly. In the event of a lower resolution video stream 112 receipt, the controller 104 may decrease the resolution of the onscreen display 106 and the onscreen display reference point 102 such that the onscreen display 106 and the onscreen display reference point 102 as suitable for viewing at the received resolution. Additionally, the controller 104 may increase the resolution of both onscreen display elements for suitability. In another implementation, the controller 104 may provide an option within the onscreen display 106 to allow the user to manually set the resolution of the video stream 112, the onscreen display 106, and the onscreen display reference point 102. The controller 104 may receive a set of customizable characteristics 108 from the onscreen display 106 as selected by a user. The controller 104 may apply the set of customizable characteristics 108 to an onscreen display reference point 102. Additionally, the controller 104 may store the set of customizable characteristics 108 to a nonvolatile memory as described later in this disclosure.

The onscreen display reference point 102 may be a graphical object to be rendered on the display 110 at a specific position on the display 110. The onscreen display reference point 102 may be affected by a set of customizable characteristics 108 as selected from an onscreen display 108.

The set of customizable characteristics 108 may include a preset, color value, alpha transparency value, a location, and a configuration. A preset may include a combination of the set of customizable characteristics 108 that a user may often select for a specific application. For example, a user may select "Preset 1" where "Preset 1" corresponds to a certain game. The color value may apply a color effect to the onscreen display reference point 102. The alpha transparency value may apply a level of transparency to the onscreen display reference point 102 so that the video stream 112 may still be observed through the onscreen display reference point. The onscreen display reference point 102 may be positioned at a location with a cartesian coordinate system. Adjustments to the positioning, may be affected utilizing offsets values in the cartesian coordinate system. The onscreen display reference point 102 may be configured by utilizing a rendering of a digital graphics file including but not limited to a bitmap (bmp), portable network graphic (png), graphics interchange format (gif), or joint photographic experts format (jpeg). The configuration may be preinstalled, or user imported into the system 100.

The onscreen display 106 may provide the user an interface into the system 100. The onscreen display 106 may present the user with options for configuring the set of customizable characteristics 108. The onscreen display 106 may provide instructions to the controller 104 to interface the non-volatile memory to either retrieve or store values corresponding to the set of customizable characteristics 108. The onscreen display 106 may provide instructions to the controller 104 to interface other interfaces to import or export values corresponding to the set of customizable characteristics 108. To support the export and the store instructions the onscreen display may provide a store command 114.

The display 110 may present a video stream 112. The video stream 112 may present a background to the onscreen display reference point 102 and the onscreen display 106. The video stream 112 may correspond to the real time rendered content of a video game.

Figure 2A:
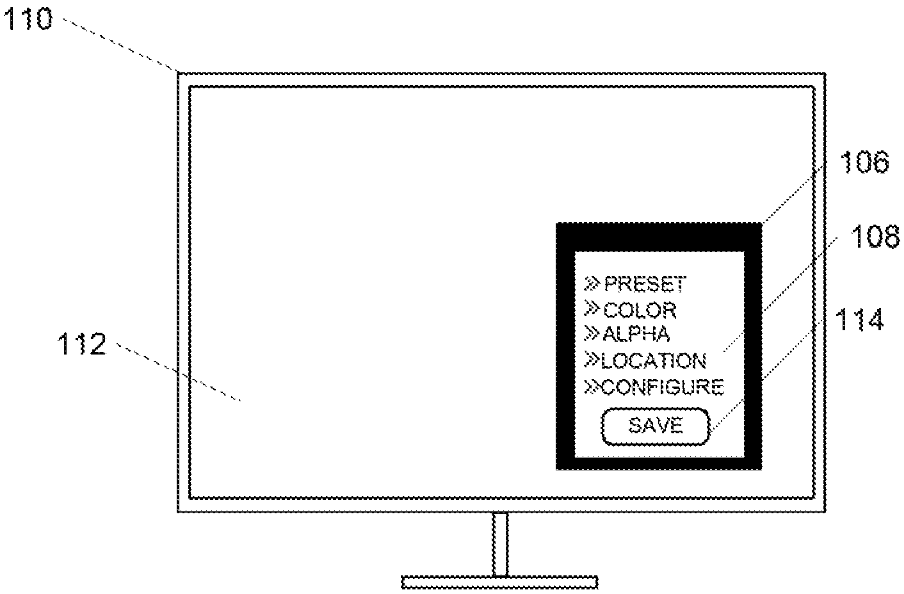
FIGS. 2A-2F are illustrations of onscreen displays for customizing onscreen display reference points, according to an example.

FIGS. 2A-2F are illustrations of onscreen displays for customizing onscreen display reference points, according to an example. Referring to FIG. 2A, an onscreen display 106 presents an initial view on the display 110. In this example, the onscreen display reference point 102 is not shown overlaid on the video stream 112. After the selection from the set of customizable characteristics 108, the onscreen display reference point 102 may be composed and rendered by the controller 104. The set of customizable characteristics 108 may be navigable utilizing a navigation button (not shown) affixed to the display where a user may move the navigation button to select direction of a cursor of the onscreen display and press the button for selection of from the set of customizable characteristics 108 from the onscreen display 106. The user may use the store command 114, depicted as a save button, to store any configuration selections to the non-volatile memory. In another implementation the store command 114 may give the user an option to export the configuration selections to an external device for archival or transfer.

Figure 2B:
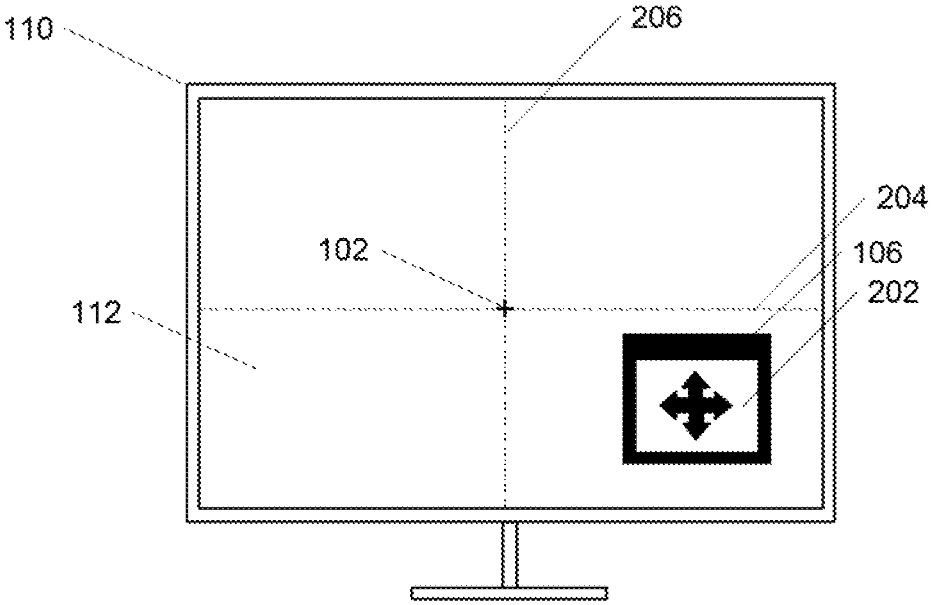

Referring to FIG. 2B, a location value configuration onscreen display 106 is depicted. In this implementation, the onscreen display 106 provides a locational adjustment 202 interface for the onscreen display reference point 102. The display 110, may provide the user with a wireframe overlay of an x and y axis. The onscreen display reference point 102 may be located at the intersection of the displayed x and y axis. The location adjustment 202 may provide the user with an option to shift the displayed x and y axis to create an offset x-axis cartesian value 204 and an offset y-axis cartesian value 206. The offset x-axis cartesian value 205 and the offset y-axis cartesian value 206 may comprise a cartesian coordinate pair offset. The offset x-axis cartesian value 204 and an offset y-axis cartesian value 206 when equaled to zero may indicate the center of the display. An augmentation of the offset x-axis cartesian value 204 and an offset y-axis cartesian value 206 may shift the onscreen display reference point 102 in the direction corresponding to the respective offset.

Figure 2C:
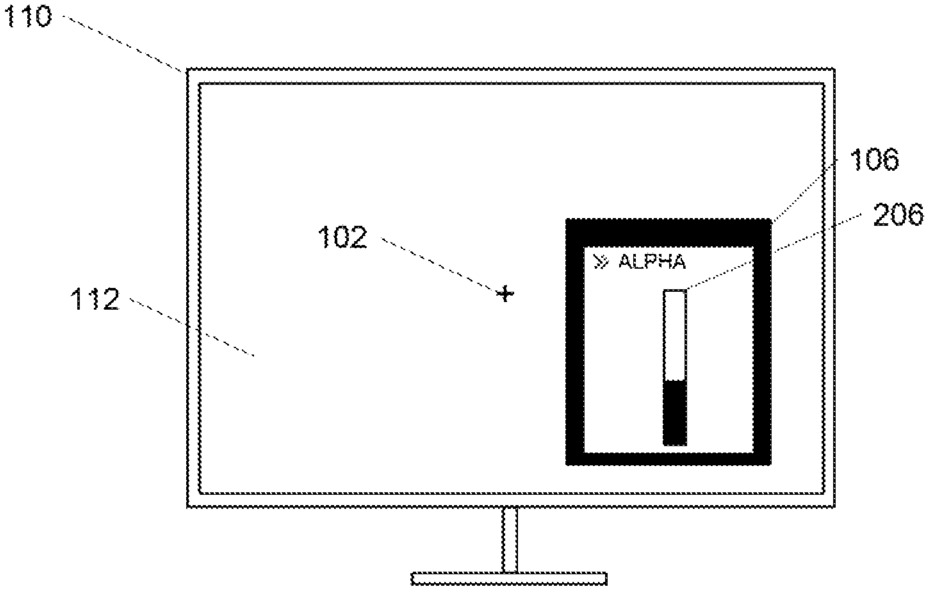

Referring to FIG. 2C, an alpha transparency value 206 configuration onscreen display 106 is depicted. In this implementation, the onscreen display 106 provides an alpha transparency value 206 as depicted as a slider widget. The slider may correspond to the amount of alpha transparency selected by a user. The onscreen display reference point 102 may be updated as the slider widget is manipulated demonstrating the alpha transparency value 206 selected by the slider widget. The slider widget may be a graphical representation of a numeric value. In another implementation, the alpha transparency value 206 may be input as a bounded numeric value via spinbox widget. In conjunction with the video stream 112, alpha transparency value 206 configuration onscreen display 106 provides the user with an accurate representation of the appearance of the onscreen display reference point 102. The alpha transparency value 206 may range from fully transparent to fully opaque. The alpha transparency value 206 of the onscreen display reference point 102 may be controlled independently from the onscreen display 106. In another example, the alpha transparency value 206 may nor any of the set of customizable characteristics 108 may be apply to the onscreen display 106.

Figure 2D:
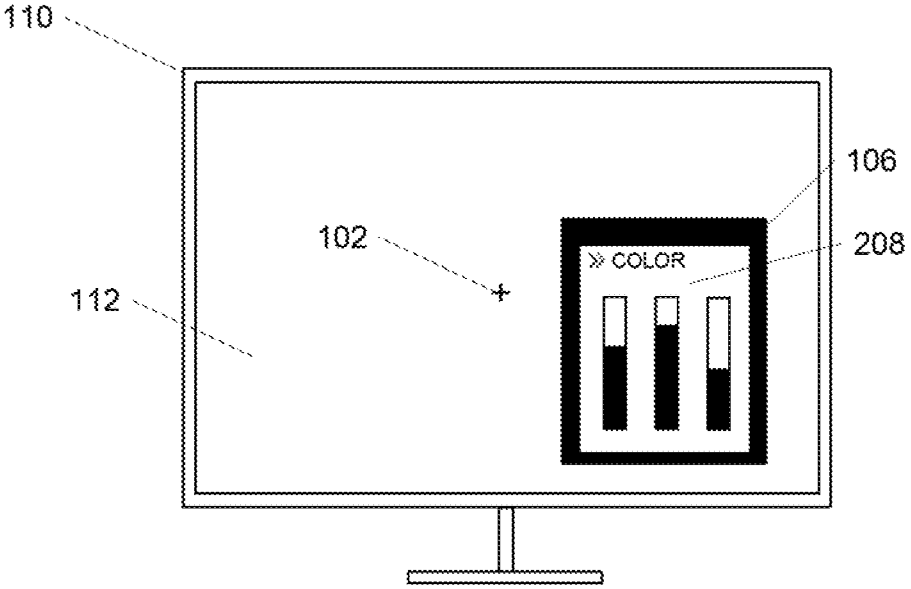

Referring to FIG. 2D, a color value 208 configuration onscreen display 106 is depicted. In this implementation, the onscreen display 106 provides a color value 208 as depicted through a series of slider widgets. The slider widgets may correspond to the red, green, and blue values selected by a user. The onscreen display reference point 102 may be updated as the slider widgets are manipulated demonstrating the color value 208 selected by the slider widgets. In conjunction with the video stream 112, the color value 208 configuration onscreen display 106 provides the user with an accurate representation of the appearance of the onscreen display reference point 102. In other implementations, the color value 208 may be represented through the onscreen display 106 as a color wheel widget. In addition, the color value 208 may be selected through other color space conventions such as but not limited to hue saturation value (HSV).

Figure 2E:
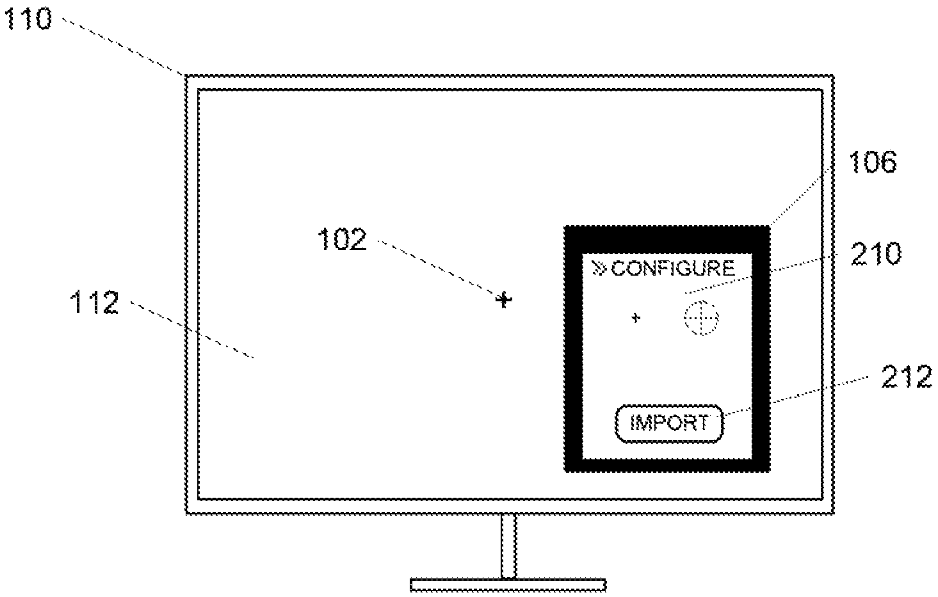

Referring to FIG. 2E, a configuration setting 210 of the onscreen display 106 is depicted. The configuration setting may include a graphic object to be used as the onscreen display reference point and a scaling factor. The configuration setting 210 may provide the user with a choice of onscreen display reference points 102. The configuration setting 210 as illustrated may include various types of targeting reticules. In another implementation, the configuration setting 210 may provide a user, via the onscreen display 106, components of an onscreen display reference point 102. The onscreen display 106 may allow the user to select one or more graphic objects to compose an onscreen display reference point 102. For example, the onscreen display 106 may include graphic objects including multiple crossbars of varying size and orientation. Crossbar choices may be solid, dashed, vertical, horizontal, or diagonal. Additionally, graphic objects such as dots and circles may be selected via the onscreen display 106. The controller 104 may composite any selected graphic objects into a single onscreen display reference point 102. The onscreen display reference point 102 may be updated as the configuration setting 210 are manipulated demonstrating a selected reticule from the onscreen display 106. The configuration setting 210 may also allow a user to select a scaling factor corresponding to specified by the user or established implicitly as determined on the video stream 112 resolution. In conjunction with the video stream 112, the configuration setting 210 provides the user with an accurate representation of the appearance of the onscreen display reference point 102. Additionally, an import selection 212 widget may be present to allow a user to introduce their own configuration setting 210 into the system. The import selection 212 may prompt the controller 104 to accept or read from a non-volatile memory to locate a cryptographically signed binary image file. The cryptographically signed binary image file may be decrypted by the controller 104 and the set of customizable characteristics extracted from the file. The controller 104 may set the onscreen display 106 set of customizable characteristics to correspond to the extracted characteristics.

Figure 2F:
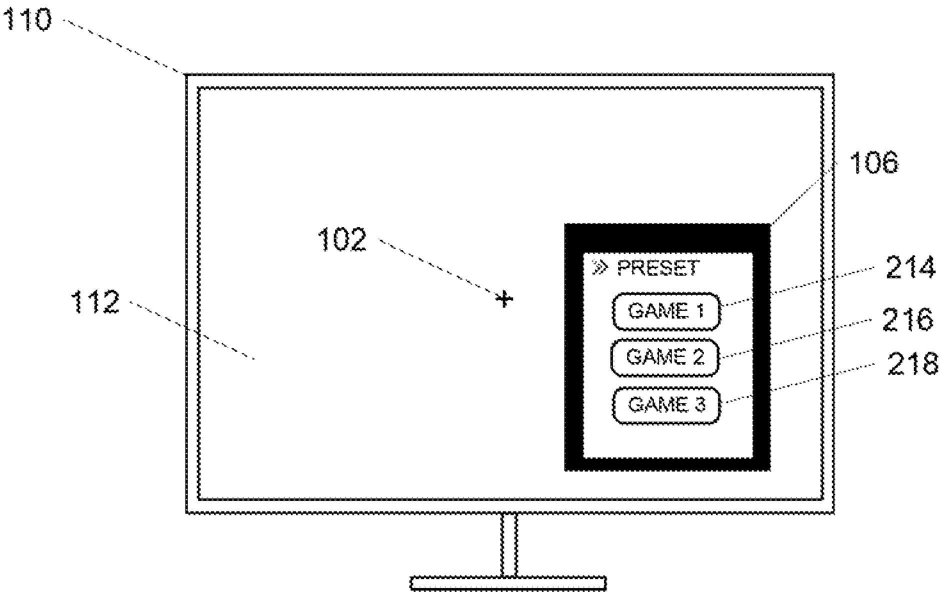

Referring to FIG. 2F, a set of preset settings 214, 216, 218 may be presented on the onscreen display 106. The preset settings 214, 216, 218 may correspond to sets of customizable characteristics 108 that have been previously stored utilizing the store command 114. In another implementation, the preset settings 214, 216, 218 may include predetermined optimal combinations of the set of customizable characteristics 108 identified for a particular application that come installed by default from the factory. For example, a preset setting 214 may correspond to a specific game. When a preset setting 214, 216, 218 is selected, the controller 104 may set the onscreen display 106 set of customizable characteristics to correspond to the preset setting 214, 216, 218.

Figure 3:
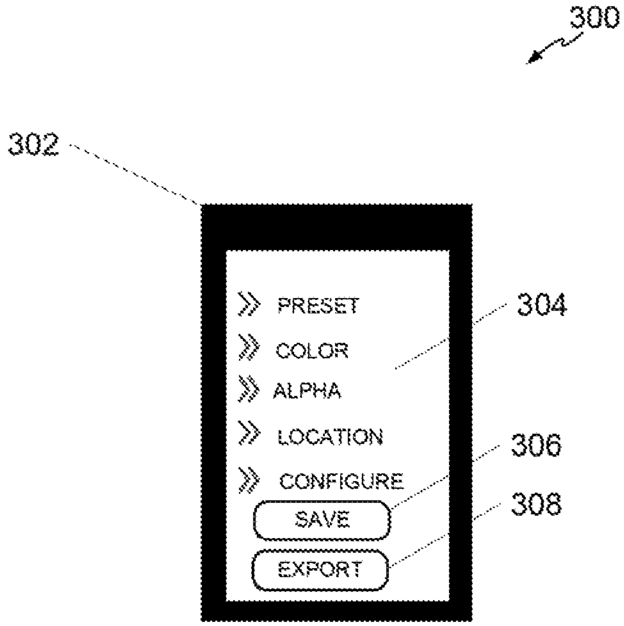
FIG. 3 is block diagram illustrating a stand-alone application for customizing onscreen display reference points, according to another example of the present disclosure.

FIG. 3 is diagram 300 illustrating a stand-alone application 302 for customizing onscreen display reference points, according to another example of the present disclosure. A stand-alone application 302 may be utilized for more detailed selection of the set of customizable characteristics 302. The stand-alone application 302 may correspond in functions and features to that of the onscreen display 106. The stand-alone application may be used by a user to customize the onscreen display reference point 102 utilizing more robust forms of input, including a mouse and keyboard as opposed to a display selection button. The stand-alone application 302 may provide the user the opportunity to issue a store command 306, local to the stand-alone application for saving a set of customizable characteristics 304. The store command 306 allows the user to save the set of customizable characteristics 304 without the set of customizable characteristics taking immediate effect on the onscreen display reference point 102. The stand-alone application 302 may provide the user with an option to issue an export command 308. The export command 308 build a cryptographically signed binary image file corresponding to the set of customizable characteristics 304. The cryptographically signed binary image file may be stored to a non-volatile memory that may be transferred to the display 110. In one example, the transfer may be implemented by exporting the cryptographically signed binary image file to a universal serial bus (USB) storage device. The USB storage device being inserted into a corresponding USB input on the display 110, and the controller receiving the cryptographically signed binary image file. While USB transfer is provided as an example, the cryptographically signed binary image file may be transferred through any storage transfer mechanism suitable for storing and transferring a cryptographically signed binary image file.

Figure 4:
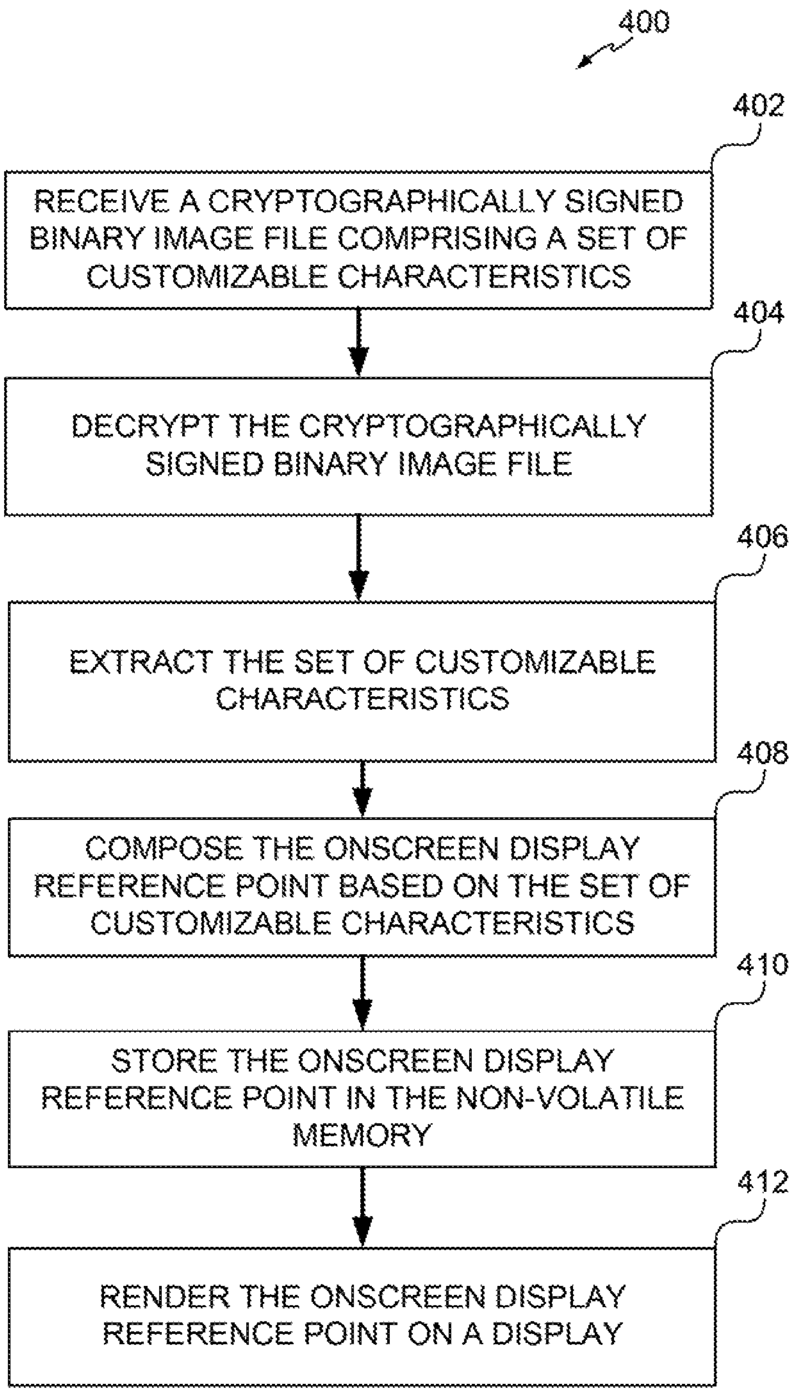
FIG. 4 is a flow diagram illustrating a method for implementing customizable onscreen display reference points, according to an example.

FIG. 4 is a flow diagram 400 illustrating a method for implementing customizable onscreen display reference points, according to an example.

At step 402, the controller 104 receives a cryptographically signed binary image file comprising a set of customizable characteristics. As described above, the cryptographically signed binary image file may be received over the universal serial bus as a transfer from a stand-alone application. In another implementation, the cryptographically signed binary image file may be transferred directly from a stand-alone application over a transfer link such as but not limited to universal serial bus.

At step 404, the controller 104 decrypts the cryptographically signed binary image file. The controller 104 utilizes decryption hardware, software, firmware or combination thereof to decrypt the cryptographically signed binary image file. The cryptographic algorithms utilized to decrypt the cryptographically signed binary image file may correspond to an encryption algorithm utilized by a stand-alone application used to encrypt the set of customizable characteristics.

At step 406, the controller 104 extracts the set of customizable characteristics. The controller 104 may extract the set of customizable characteristics utilizing a parsing algorithm. The parsing algorithm may be a shared implementation with the stand-alone application for the construction of a consistent data structure to which both the controller 104 and the stand-alone application At step 408, the controller 104 composes the onscreen display reference point based on the set of customizable characteristics. The controller 104 may utilize all of the set of customizable characteristics and apply them to the onscreen display reference point. The controller 104 may include a rasterizer and a scaler to appropriately apply the set of customizable characteristics for the selected or detected resolution of the video stream.

At step 410, the controller 104 stores the onscreen display reference point in the non-volatile memory. The controller 104 may save the onscreen display reference point as well as the set of customizable characteristics to non-volatile memory on the display 110. The storage may include an implicit temporary storage where the user has not indicated a specific preset to store the desired onscreen display reference point. The implicit temporary storage may be utilized by the user to do evaluation of the onscreen display reference point in a single gaming session. The storage may also include the explicit storage where the user has indicated a specific preset to store the desired onscreen display reference point.

Figure 5:
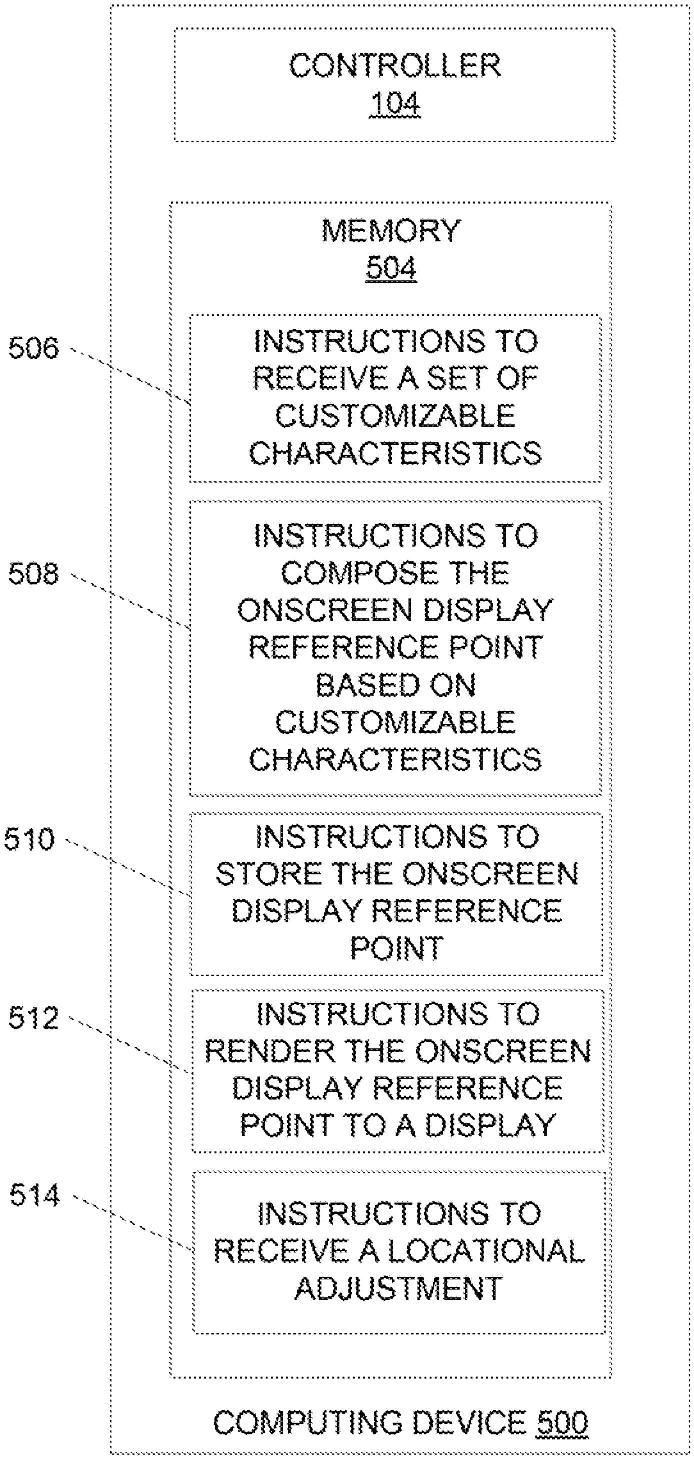
FIG. 5 is a computing device for supporting customizable onscreen display reference points, according to an example.

At step 412, the controller 104 renders the onscreen display reference point on a display. The controller 104 may apply the onscreen display reference point to the display. The rendering may be separate from the video stream 112 as the onscreen display reference point does not exist in the frame buffer of the system rendering the video stream 112. The controller 104 may apply the onscreen display reference point as an overlay to the video stream 112. The controller may also apply the alpha channel value to the onscreen display reference point FIG. 5 is a computing device for supporting customizable onscreen display reference points, according to an example. The computing device 500 depicts a controller 104 and a memory device 504 and, as an example of the computing device 500 performing its operations, the memory device 504 may include instructions 506-514 that are executable by the controller 104. The controller 104 may be synonymous with the processor found in common computing environments including but not limited to central processing units (CPUs). The memory device 504 can be said to store program instructions that, when executed by controller 104, implement the components of the computing device 500. The executable program instructions stored in the memory device 504 include, as an example, instructions to receive a set of customizable characteristics 506, instructions to compose the onscreen display reference point based on the set of customizable characteristics 508, instruction to store the onscreen display reference point 510, instructions to render the onscreen display reference point to a display 512 and instructions to receive a locational adjustment 514.

Memory device 504 represents generally any number of memory components capable of storing instructions that can be executed by controller 104. Memory device 504 is non-transitory in the sense that it does not encompass a transitory signal but instead is made up of at least one memory component configured to store the relevant instructions. As a result, the memory device 504 may be a non-transitory computer-readable storage medium. Memory device 504 may be implemented in a single device or distributed across devices. Likewise, controller 104 represents any number of processors capable of executing instructions stored by memory device 504. Controller 104 may be integrated in a single device or distributed across devices. Further, memory device 504 may be fully or partially integrated in the same device as controller 104, or it may be separate but accessible to that device and controller 104.

In one example, the program instructions 506-514 can be part of an installation package that, when installed, can be executed by controller 104 to implement the components of the computing device 500. In this case, memory device 404 may be a portable medium such as a CD, DVD, or flash drive, or a memory maintained by a server from which the installation package can be downloaded and installed. In another example, the program instructions may be part of an application or applications already installed. Here, memory device 504 can include integrated memory such as a hard drive, solid state drive, or the like.

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the scope of the disclosure. Thus, the present disclosure is not intended to be limited to the examples shown herein but is to be accorded the widest scope consistent with the principles and novel features disclosed herein.

What is claimed is:

1. A system comprising:
- a display to:
  - present, on a display screen of the display, a video stream and an onscreen display reference point; and
- a controller to:
  - receive, in a cryptographically signed file, a set of customizable characteristics corresponding to the onscreen display reference point, and
  - render, when the controller decrypts the cryptographically signed file to compose the onscreen display reference point based on the set of customizable characteristics, the onscreen display reference point on the display screen as an overlay to the video stream.

2. The system of claim 1, wherein the customizable characteristics comprise a color, a configuration setting, and an alpha channel value.

3. The system of claim 2, wherein the configuration setting is independent to a resolution of the display.

4. The system of claim 2 wherein the rendering applies the alpha channel value from the customizable characteristics to the onscreen display reference point.

5. The system of claim 1, wherein the display is to:
- present, on the display screen, the set of customizable characteristics.

6. The system of claim 1, wherein the controller is to render the onscreen display reference point independent of the video stream.

7. The system of claim 1, wherein the cryptographically signed file is a cryptographically signed binary image file.

8. The system of claim 1, wherein the controller receives the cryptographically signed file over a universal serial bus.

9. A method comprising:
- receiving, by a controller, a cryptographically signed file comprising a set of customizable characteristics corresponding to an onscreen display reference point;
- extracting, by the controller when the controller decrypts the cryptographically signed file, the set of customizable characteristics from the cryptographically signed file; and
- rendering, by the controller when the controller extracts the set of customizable characteristics to compose the onscreen display reference point based on the set of customizable characteristics, the onscreen display reference point on a display.

10. The method of claim 9, wherein the customizable characteristics comprise a color, a configuration setting, and an alpha channel value.

11. The method of claim 10, wherein the configuration setting is independent of a resolution of the display.

12. The method of claim 10, wherein the rendering applies the alpha channel value from the customizable characteristics to the onscreen display reference point.

13. The method of claim 9, further comprising:
- receiving a locational adjustment of the onscreen reference point, wherein the locational adjustment comprises a cartesian coordinate pair offset.

14. The method of claim 9, wherein the rendering is independent of a video stream.

15. The method of claim 9, wherein the cryptographically signed file is a cryptographically signed binary image file.

16. A display device comprising:
- a non-volatile memory having instructions stored thereon;
- a display; and
- a processor configured to perform, when executing the instructions to:
  - receiving, in a cryptographically signed binary image file, a set of customizable characteristics corresponding to an onscreen display reference point;
  - decrypting the set of customizable characteristics;
  - composing the onscreen display reference point based on the set of customizable characteristics;
  - storing the onscreen display reference point in the non-volatile memory, wherein the non-volatile memory is integrated into the display device with the processor and the display;
  - rendering the onscreen display reference point on the display, wherein the rendering is independent of a video stream; and
  - receiving a locational adjustment of the onscreen reference point, wherein the locational adjustment comprises a cartesian coordinate pair offset.

17. The display device of claim 16, wherein the customizable characteristics comprise a color, a configuration setting, and an alpha channel value.

18. The display device of claim 17, wherein the scaling factor corresponds to a resolution of the display.

19. The display device of claim 17, wherein the rendering applies the alpha channel value from the customizable characteristics to the onscreen display reference point.

20. The display device of claim 16, wherein the processor is configured to:

render, when the controller decrypts the cryptographically signed file to compose the onscreen display reference point based on the set of customizable characteristics, the onscreen display reference point on the display screen as an overlay to the video stream.

* * * * *